(12) United States Patent
Huang

(10) Patent No.: US 9,651,229 B1
(45) Date of Patent: May 16, 2017

(54) SUCTION ANCHORING DEVICE AND LIGHT FIXTURE HAVING THE SAME

(71) Applicant: REALLY USEFUL COMPANY LTD., Apia (WS)

(72) Inventor: Yi-Li Huang, Apia (WS)

(73) Assignee: REALLY USEFUL COMPANY LTD., Apia (WS)

( * ) Notice: Subject to any disclaimer, the term of this patent is extended or adjusted under 35 U.S.C. 154(b) by 0 days.

(21) Appl. No.: 15/098,812

(22) Filed: Apr. 14, 2016

(51) Int. Cl.
| | |
|---|---|
| *B60Q 1/00* | (2006.01) |
| *B60Q 3/00* | (2017.01) |
| *F21V 11/00* | (2015.01) |
| *F21V 21/092* | (2006.01) |
| *F16M 13/02* | (2006.01) |
| *F16B 47/00* | (2006.01) |
| *F21S 6/00* | (2006.01) |

(52) U.S. Cl.
CPC ............ *F21V 21/092* (2013.01); *F16B 47/00* (2013.01); *F16M 13/022* (2013.01); *F21S 6/002* (2013.01)

(58) Field of Classification Search
CPC ........ F21V 21/092; F21S 6/002; F16B 47/00; F16M 13/022
See application file for complete search history.

(56) References Cited

FOREIGN PATENT DOCUMENTS

GB              191515082 A  *  2/1916  .............. F16B 47/00

* cited by examiner

*Primary Examiner* — Donald Raleigh
(74) *Attorney, Agent, or Firm* — Nixon & Vanderhye P.C.

(57) ABSTRACT

A suction anchoring device for use in a light fixture includes a base unit and a movable unit. The base unit includes a casing defining a vent opening, and a surface-contacting member. The movable unit includes a mounting seat slidably disposed in the casing, and a seal member disposed under the mounting seat. The movable unit is movable relative to the base unit between an anchored position, where the seal member sealingly covers the vent opening so as to form a suction-forming space in which a part of air is vented out to create a suction force, and a lifted position, where the seal member is spaced apart from the vent opening to dismiss the suction force. A light fixture including the suction anchoring device is also disclosed.

16 Claims, 8 Drawing Sheets

SUCTION ANCHORING DEVICE AND LIGHT FIXTURE HAVING THE SAME

FIELD

The disclosure relates to a suction anchoring device, more particularly to a suction anchoring device used for anchoring a light fixture on a contact surface. The disclosure also relates to a light fixture including the suction anchoring device.

BACKGROUND

A conventional light fixture, such as a table lamp, usually includes a housing, a connecting seat connected to the housing, and a light-emitting element disposed on the connecting seat. The light-emitting element is, for example, a light bulb or a candle. The housing includes a base wall that is in contact with a contact surface, e.g., a tabletop, when the conventional light fixture is stood upright. When the conventional light fixture encounters a sidewise external force that is larger than a friction force generated between a bottom surface of the base wall and the contact surface, the conventional light fixture may be knocked over, which may damage the housing, and may even create a fire hazard.

SUMMARY

Therefore, an object of the disclosure is to provide a suction anchoring device that can alleviate at least one of the drawbacks of the prior art.

According to one aspect of the disclosure, the suction anchoring device is adapted to use in a light fixture for anchoring the light fixture on a contact surface. The light fixture includes a main body. The suction anchoring device includes a base unit and a movable unit.

The base unit includes a casing and a surface-contacting member. The casing includes a bottom wall that defines a vent opening extending therethrough, and a surrounding wall that cooperates with the bottom wall to define an internal space therebetween. The surface-contacting member is disposed under and attached to the bottom wall, is adapted to contact the contact surface when the light fixture is placed on the contact surface, and defines a through hole in spatial communication with the vent opening.

The movable unit includes a mounting seat, a seal member, and a connecting member. The mounting seat is slidably disposed in the internal space. The seal member is disposed in the internal space, is attached to the mounting seat, and has a press surface that faces the vent opening. The connecting member co-movably interconnects the mounting seat and the main body of the light fixture.

When the light fixture is being placed on the contact surface, the movable unit is moved relative to the base unit, by weight of the main body of the light fixture, from a lifted position, where the seal member is free from contacting the bottom wall of the casing, to an anchored position, where the press surface of the seal member sealingly covers the vent opening so as to form a suction-forming space which is cooperatively defined by the base unit and the contact surface, and in which a part of air is vented out to provide a suction force that permits the surface-contacting member to be stably attached onto the contact surface. When the movable unit is being lifted from the contact surface, the movable unit is moved relative to the base unit from the anchored position to the lifted position, such that the press surface of the seal member is spaced apart from the vent opening to establish spatial communication between the suction-forming space and the internal space and to dismiss the suction force.

Another object of the disclosure is to provide a light fixture including the suction anchoring device that can alleviate at least one of the drawbacks of the prior art.

According to another aspect of the disclosure, the light fixture includes the abovementioned suction anchoring device and the main body including a housing, a connecting seat, and a light-emitting unit.

The housing defines a containing space that receives the suction anchoring device therein. The connecting seat is disposed on the housing and is connected to the connecting member of the suction anchoring device. The light-emitting unit is disposed on the connecting seat.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
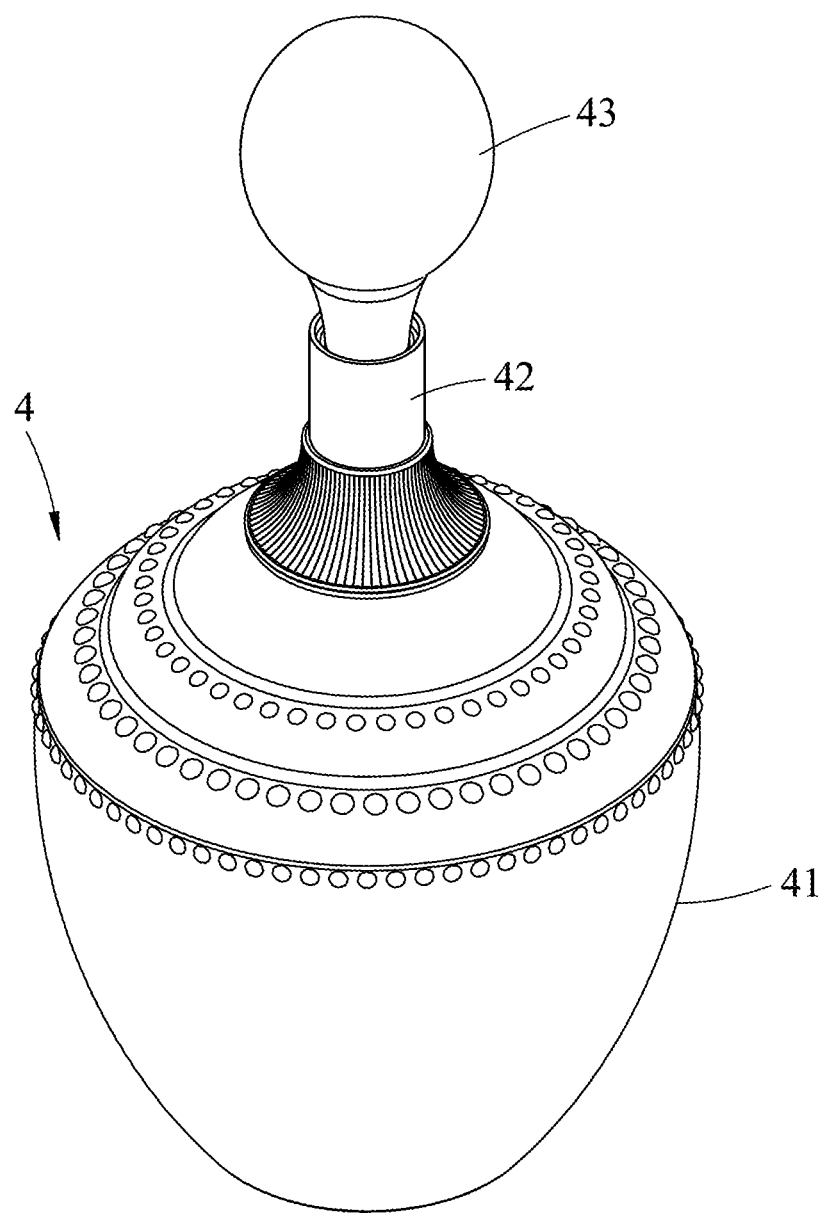
FIG. 1 is a perspective view illustrating a first embodiment of a light fixture according to the disclosure.

Before the disclosure is described in greater detail, it should be noted that where considered appropriate, reference numerals have been repeated among the figures to indicate corresponding or analogous elements, which may optionally have similar characteristics.

Figure 2:
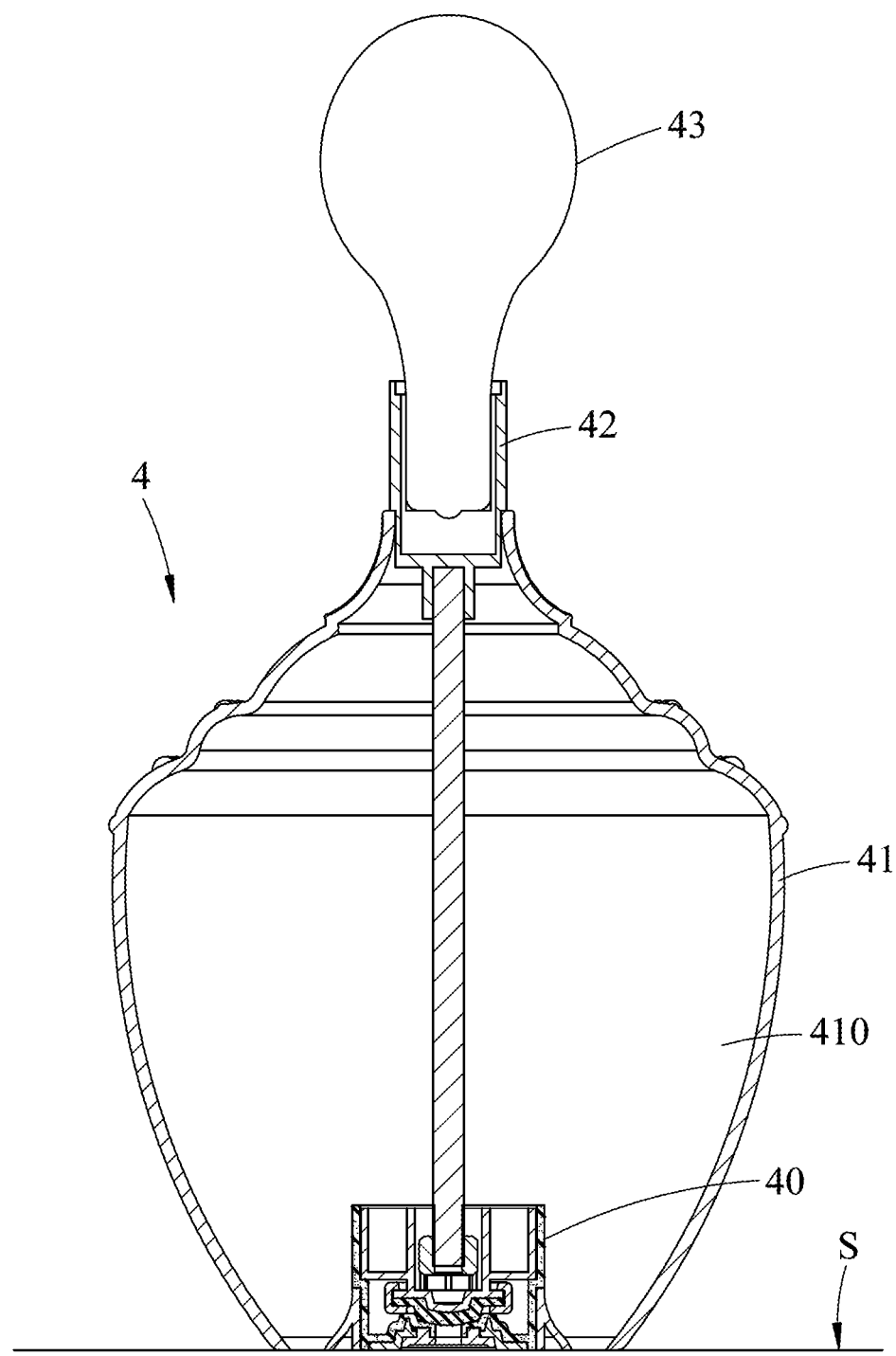
FIG. 2 is a partly sectional view illustrating the first embodiment.

Referring to FIGS. 1 to 2, the first embodiment of a light fixture 4 according to the present disclosure includes a suction anchoring device 40, and a main body which includes a housing 41, a connecting seat 42, and a light-emitting unit 43.

The housing 41 defines a containing space 410 that receives the suction anchoring device 40 therein. The connecting seat 42 is disposed on the housing 41, and is disposed above and connected to the suction anchoring device 40. The light-emitting unit 43 is disposed on the connecting seat 42. In this embodiment, the light-emitting unit 43 includes a light bulb.

Referring to FIGS. 3 to 6, the suction anchoring device 40 includes a base unit 1 and a movable unit 2.

The base unit 1 of this embodiment includes a casing 11, a surface-contacting member 12, a fixing member 13, and a support seat 14.

The casing 11 of this embodiment includes a bottom wall 111 (see FIG. 4) and a surrounding wall 112. The bottom wall 111 defines a vent opening 113 extending therethrough, and has a top surface 111a formed with two ring-shaped projections 114 (also see FIG. 6) that are spaced apart from each other. In certain embodiments, the top surface 111a may be formed with only one ring-shaped projection 114. The surrounding wall 112 includes an upper section 116, and a lower section 117 connected to the upper section 116, having a width less than that of the upper section 116, and cooperating with the upper section 116 to form an annular shoulder 118 therebetween. The surrounding wall 112 and the bottom wall 111 cooperatively define an internal space 110 therebetween.

The surface-contacting member 12 of this embodiment is disposed under and attached to the bottom wall 111, corresponds in shape to the bottom wall 111, and defines a vertical through hole 121 (see FIG. 4) in spatial communication with the vent opening 113. In this embodiment, the surface-contacting member 12 is made of a resilient material, e.g., silicone.

The fixing member 13 of this embodiment fixes the surface-contacting member 12 onto the bottom wall 111 of the casing 11, and is formed with a through hole 131 in spatial communication with the vent opening 113 and the through hole 121. In this embodiment, the fixing member 13 is fixed to the bottom wall 111 of the casing 11 by ultrasonic welding so as to fix the surface-contacting member 12 onto the casing 11.

Figure 4:
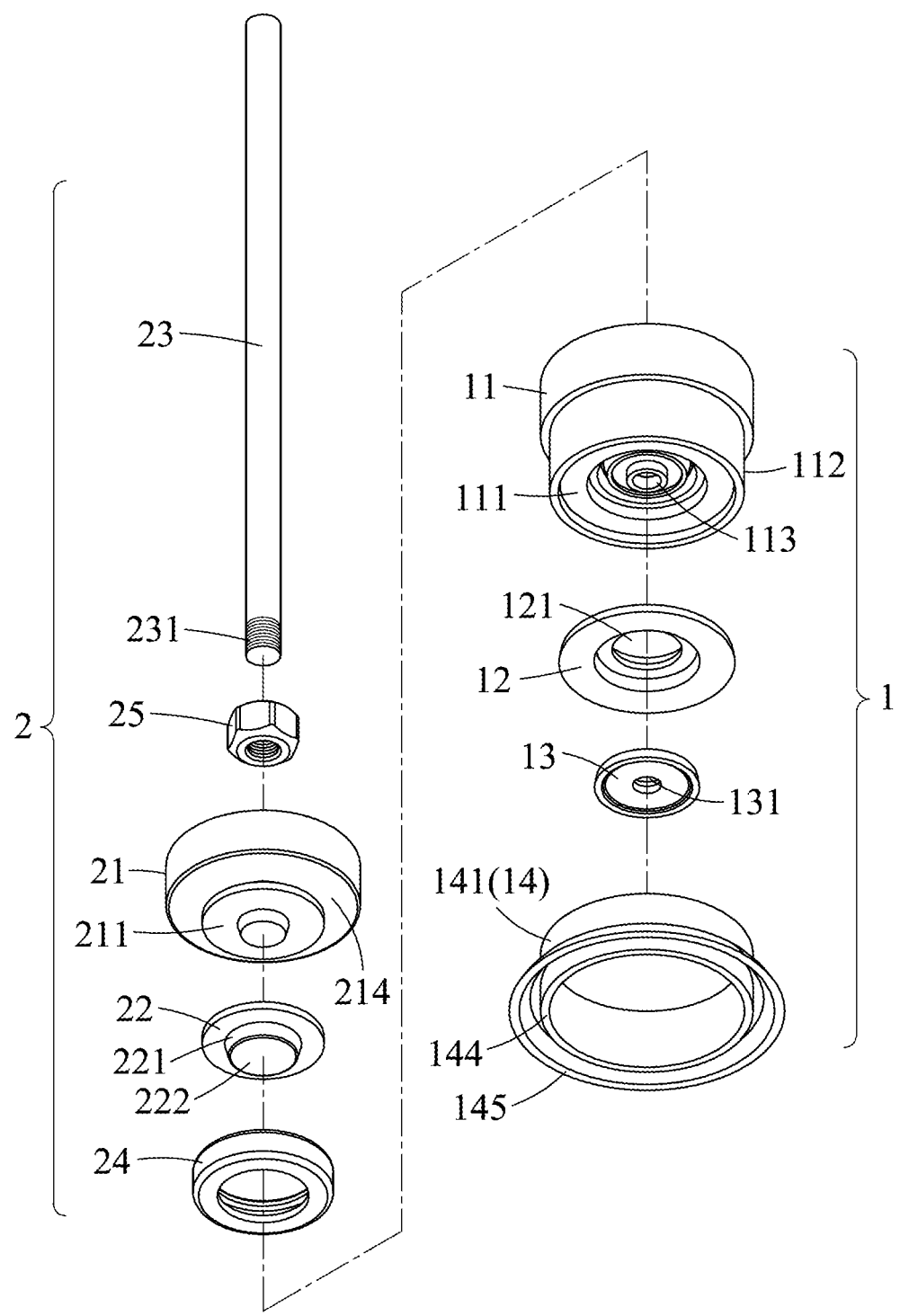
FIG. 4 is an exploded bottom perspective view illustrating the suction anchoring device of the first embodiment.
Figure 5:
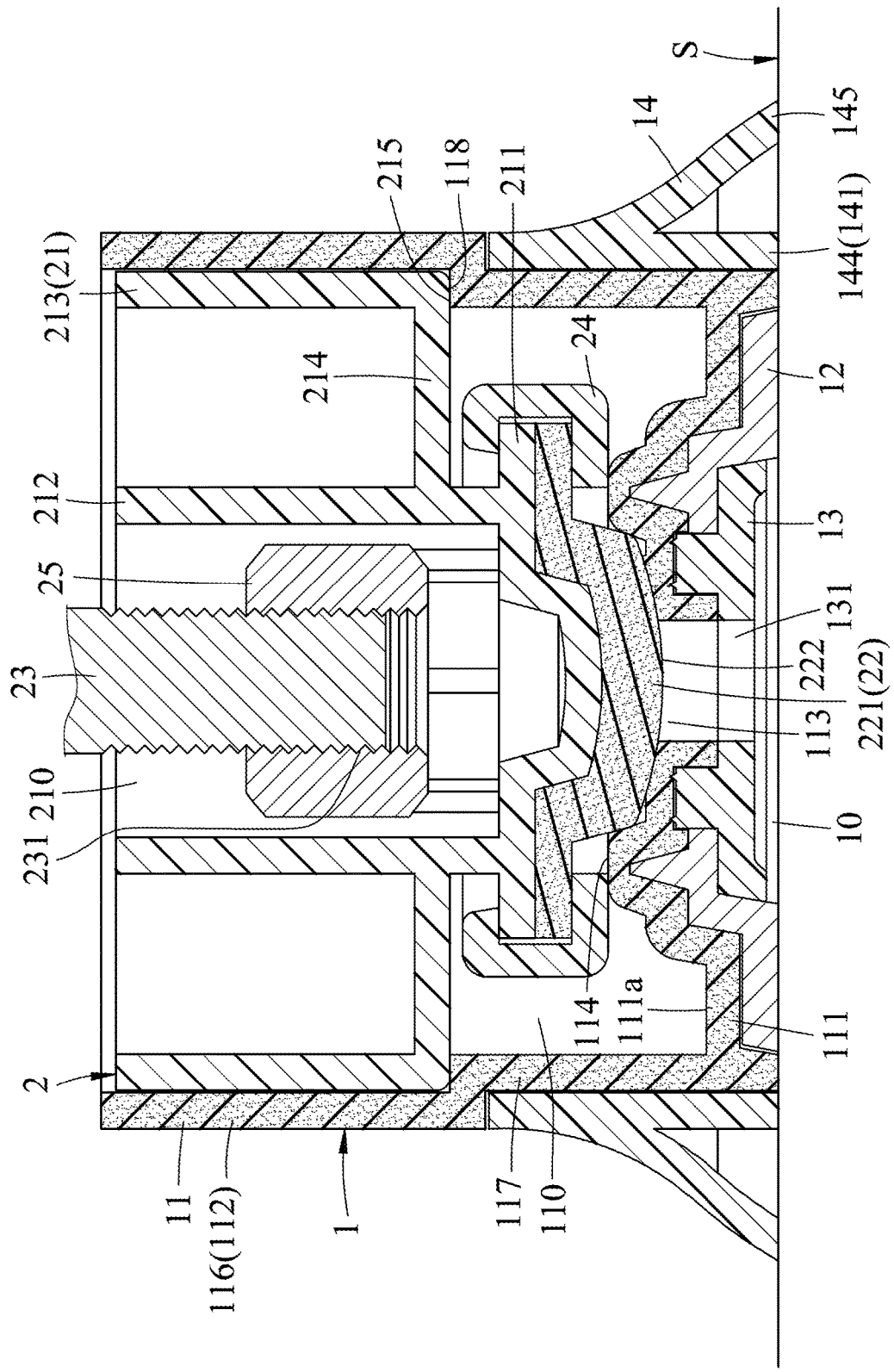
FIG. 5 is a fragmentary sectional view illustrating the suction anchoring device of the first embodiment at an anchored position.

The support seat 14 of this embodiment includes a main body 141 that has an annular central part 144 surrounding the lower section 117 of the surrounding wall 112 of the casing 11, and a skirt part 145 extending downwardly and outwardly from a top end of the annular central part 144 so as to provide support to the casing 11, as illustrated in FIGS. 4 and 5. In this embodiment, the main body 141 of the support seat 14 and the casing 11 are made of a plastic material, e.g., polypropylene or polyethylene, and are fixed together by ultrasonic welding.

Figure 3:
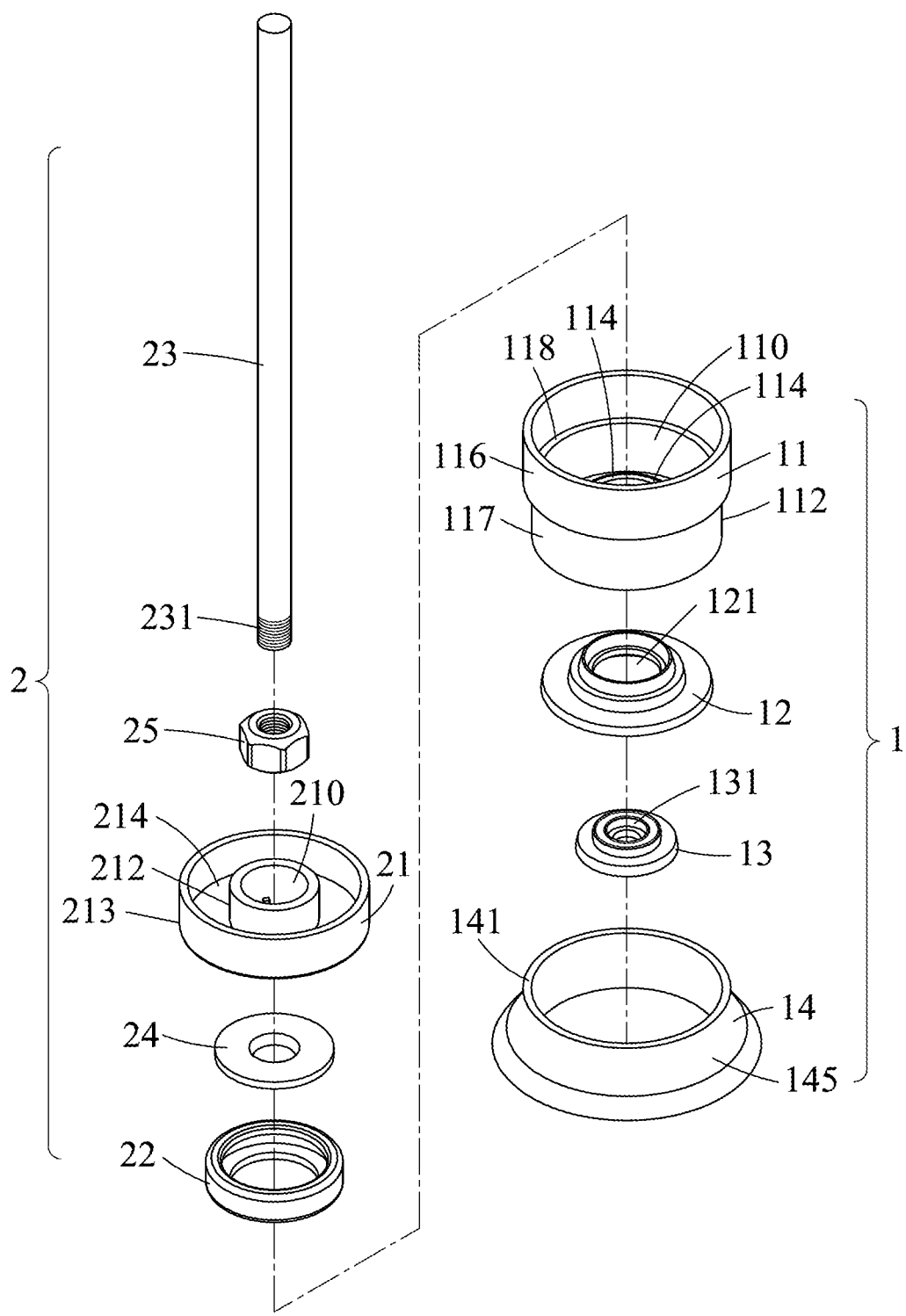
FIG. 3 is an exploded top perspective view illustrating a suction anchoring device of the first embodiment.

The movable unit 2 of this embodiment includes a vertical connecting member 23, a mounting seat 21, a positioning member 25, a seal member 22, and a retaining member 24 as shown in FIGS. 3 and 4.

The connecting member 23 of this embodiment co-movably interconnects the mounting seat 21 and the connecting seat 42 of the light fixture 4 (see FIG. 2). In this embodiment, the connecting member 23 has a bottom end 231 that is formed with an external thread.

As best shown in FIG. 5, the mounting seat 21 of this embodiment is slidably disposed in the internal space 110, and includes a base wall 211, an inner wall 212, an outer wall 213, and a connecting wall 214. The inner wall 212 extends upwardly from the base wall 211, and cooperates with the base wall 211 to define a receiving space 210 that receives the bottom end 231 of the connecting member 23. The outer wall 213 is spaced apart from the inner wall 212, and is in slidable contact with an inner surface of the upper section 116 of the casing 11. The connecting wall 214 interconnects the inner and outer walls 212, 213.

The positioning member 25 of this embodiment is disposed in the receiving space 210, and has an inner surface formed with an internal thread that threadedly engages the bottom end 231 of the connecting member 23 to stably position the bottom end 231 of the connecting member 23 in the receiving space 210. In this embodiment, the positioning member 25 is, but not limited to, a screw nut.

The seal member 22 of this embodiment is disposed under and attached to the base wall 211 of the mounting seat 21, and has a convex central portion 221 that is convex toward the vent opening 113, and that has a press surface 222 facing the vent opening 113. In this embodiment, the seal member 22 is made of a resilient material, e.g., silicone.

The retaining member 24 of this embodiment is coupled to the base wall 211 of the mounting seat 21 so as to securely retain the seal member 22 on a bottom surface of the base wall 211.

Figure 6:
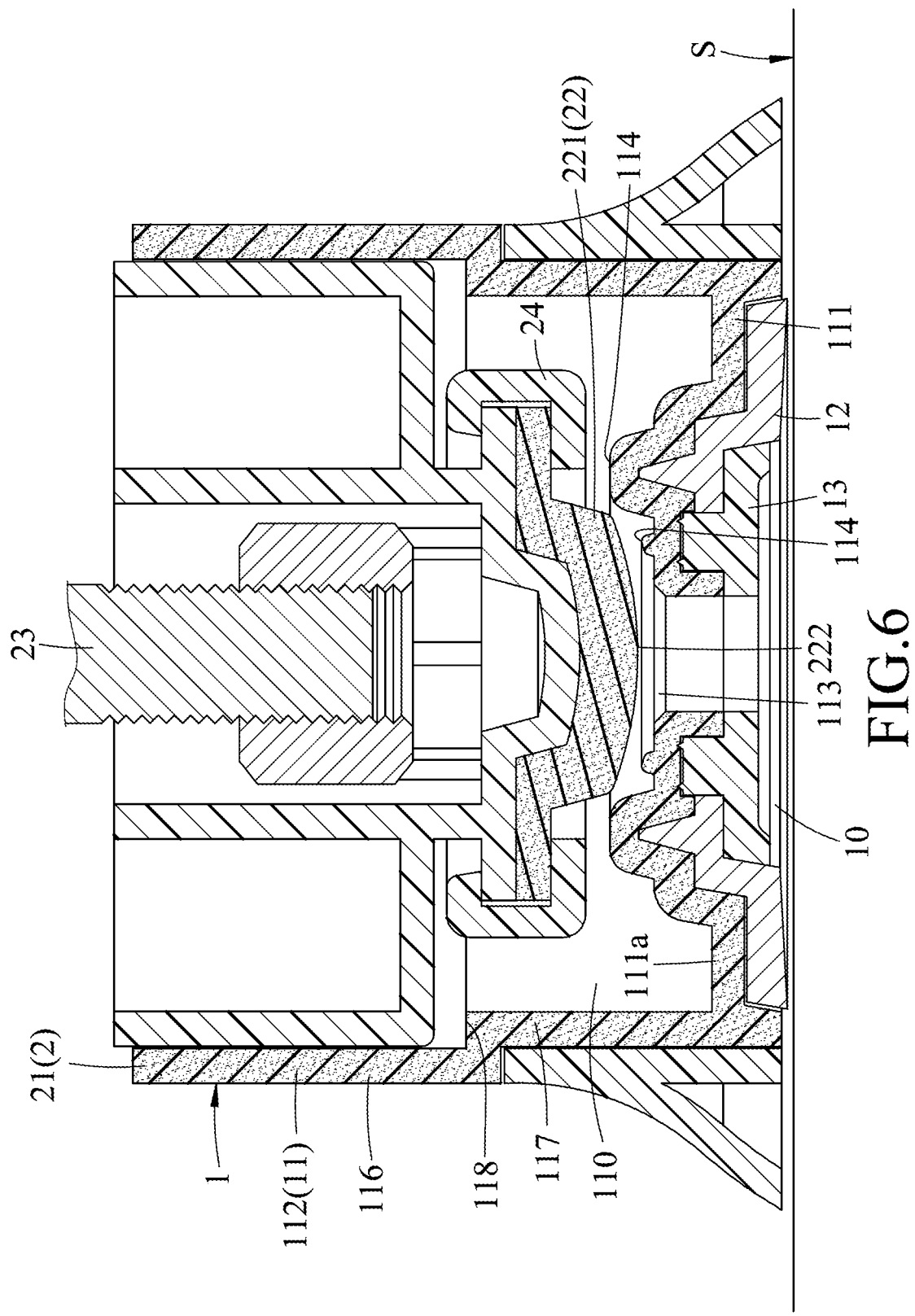
FIG. 6 is a sectional view similar to FIG. 5, illustrating the suction anchoring device of the first embodiment at a lifted position.

Referring to FIGS. 5 and 6, when the light fixture 4 of this embodiment is being placed on a contact surface (S), a bottom surface of the surface-contacting member 12 of the base unit 1 contacts the contact surface (S), and the movable unit 2 is moved relative to the base unit 1 from a lifted position (see FIG. 6) to an anchored position (see FIG. 5) by weight of the main body of the light fixture 4, more specifically by the weights of the housing 41, of the connecting seat 42, and of the light-emitting unit 43 imposing on the mounting seat 21 through the connecting member 23. When the movable unit 2 is at the lifted position as illustrated in FIG. 6, the seal member 22 is free from contacting the bottom wall 111 of the casing 11. When the movable unit 2 is moved to the anchored position, a bottom end 215 of the outer wall 213 of the mounting seat 21 abuts against the annular shoulder 118 of the casing 11, the convex central portion 221 of the seal member 22 abuts tightly against the ring-shaped projections 114 so as to block spatial communication between the vent opening 113 and the internal space 110, and the press surface 222 of the seal member 22 sealingly covers the vent opening 113 so as to form a suction-forming space 10 which is cooperatively defined by the base unit 1 and the contact surface (S). In the meantime, a part of air in the suction-forming space 10 is vented out due to deformation of the surface-contacting member 12 so as to provide a suction force that permits the bottom surface of the surface-contacting member 12 to be stably attached onto the contact surface (S). On the other hand, when the light fixture 4 is being lifted up from the contact surface (S) in a vertical direction, the mounting seat 21 is moved upwardly together with the connecting member 23, and the convex central portion 221 of the seal member 22 is lifted off from the ring-shaped projections 114 of the casing 11. At this time, the movable unit 2 is moved back to the lifted position (see FIG. 6), where the press surface 222 of the seal member 22 is spaced apart from the vent opening 113 to reestablish the spatial communication between the suction-forming space 10 and the internal space 110 and to dismiss the suction force.

To sum up, by virtue of the suction anchoring device 40, the light fixture 4 can be securely attached to the contact surface (S) via the suction force, and is less likely to be knocked over by a sidewise external force. Furthermore, the suction force is easily removed by vertically lifting up the light fixture 4.

Figure 7:
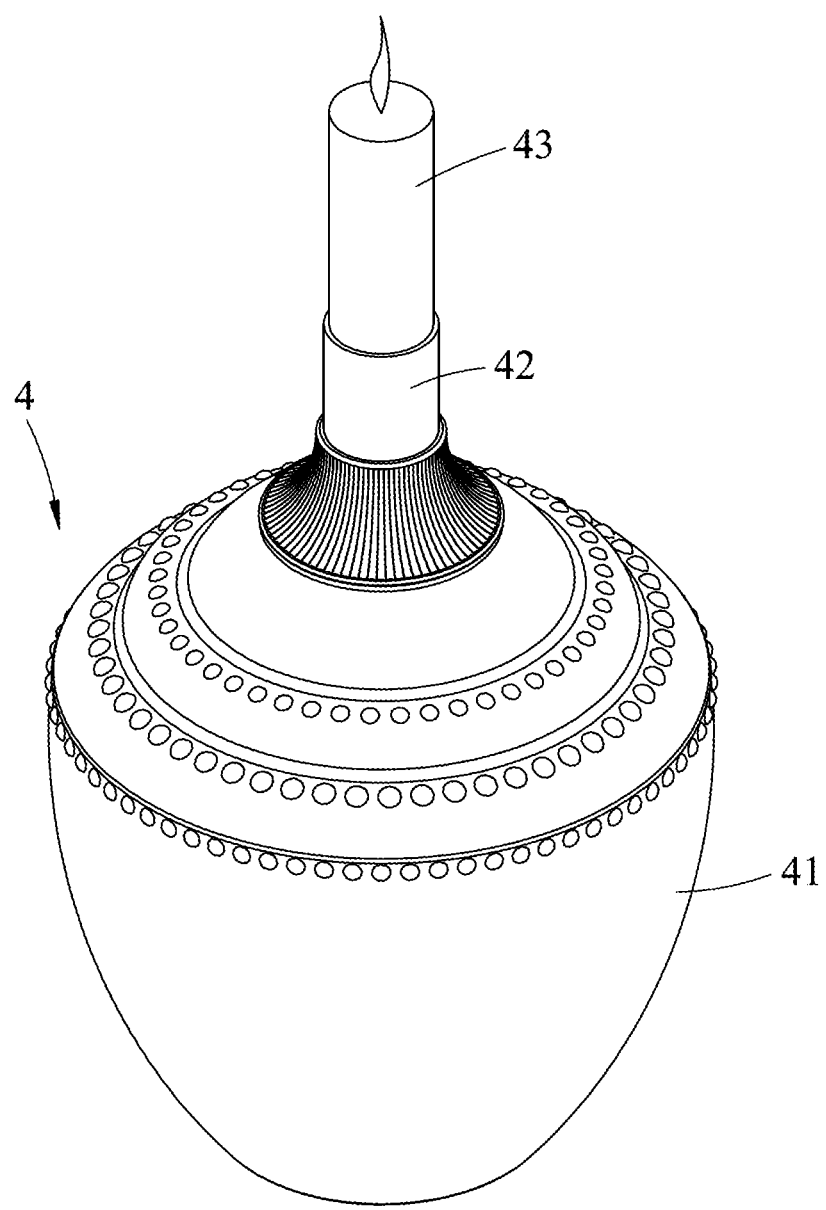
FIG. 7 is a perspective view illustrating a modification of a light-emitting unit of the first embodiment.

Referring to FIG. 7, in a modification of the first embodiment, the light-emitting unit 43 may include a candle, and the connecting seat 42 may be a candlestick.

Figure 8:
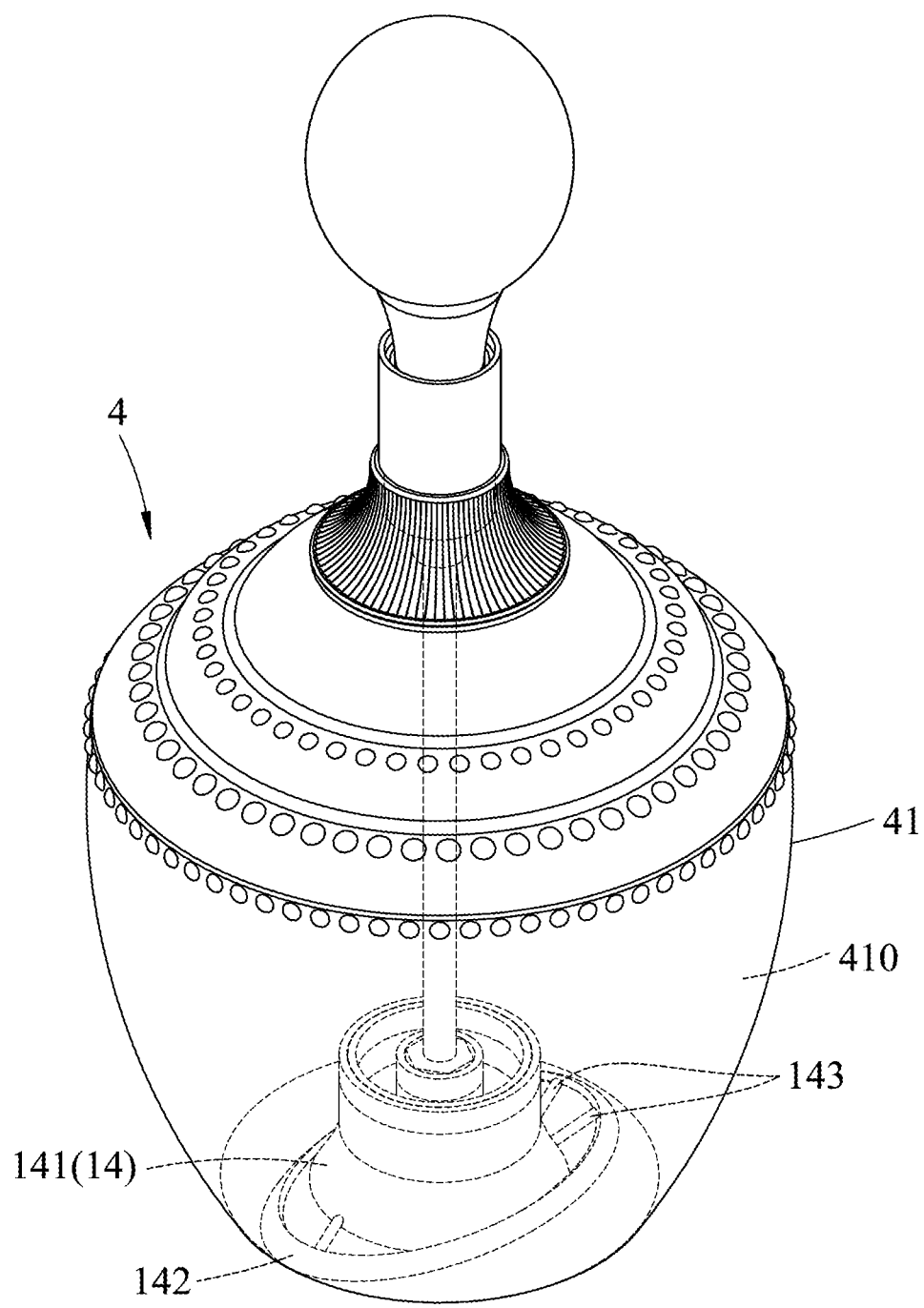
FIG. 8 is a perspective view illustrating a second embodiment of the light fixture according to the disclosure.

Referring to FIG. 8, a second embodiment of the light fixture 4 according to the disclosure is similar to the first embodiment, where the difference between the first and second embodiments resides in that the support seat 14 of the second embodiment further includes an outer frame 142 that surrounds and is spaced apart from the main body 141 of the support seat 14 and that is disposed in the containing space 410, and a plurality of angularly spaced-apart connecting pieces 143 that interconnect the outer frame 142 and the main body 141 of the support seat 14. The outer frame 142 and the connecting pieces 143 provide further support to prevent the light fixture 4 from being knocked over. In this embodiment, the outer frame 142 is oval in shape, and each of the connecting pieces 143 is, but not limited to, a metal bar. In certain embodiments, each of the connecting pieces 143 may be configured as a rod which is made of a phosphorescent material.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A suction anchoring device adapted to use in a light fixture for anchoring the light fixture on a contact surface, the light fixture including a main body, said suction anchoring device comprising:
    a base unit that includes
        a casing including a bottom wall that defines a vent opening extending therethrough, and a surrounding wall that cooperates with said bottom wall to define an internal space therebetween, and
        a surface-contacting member disposed under and attached to said bottom wall, adapted to contact the contact surface when the light fixture is placed on the contact surface, and defining a through hole in spatial communication with said vent opening; and
    a movable unit that includes
        a mounting seat slidably disposed in said internal space of said casing,
        a seal member disposed in said internal space, attached to said mounting seat, and having a press surface that faces said vent opening, and
        a connecting member co-movably interconnecting said mounting seat and the main body of the light fixture, wherein, when the light fixture is being placed on the contact surface, said movable unit is moved relative to said base unit, by weight of the main body of the light fixture, from a lifted position, where said seal member is free from contacting said bottom wall of said casing, to an anchored position, where said press surface of said seal member sealingly covers said vent opening so as to form a suction-forming space which is cooperatively defined by said base unit and the contact surface, and in which a part of air is vented out to provide a suction force that permits said surface-contacting member to be stably attached onto the contact surface;
    wherein, when the light fixture is being lifted from the contact surface, said movable unit is moved relative to said base unit from the anchored position to the lifted portion, such that said press surface of said seal member is spaced apart from said vent opening to establish spatial communication between said suction-forming space and said internal space and to dismiss the suction force.

2. The suction anchoring device as claimed in claim 1, wherein:
    said bottom wall of said casing has a top surface formed with at least one ring-shaped projection; and
    said seal member has a convex central portion that is convex toward said vent opening, that has said press surface, and that abuts tightly against said at least one ring-shaped projection when said movable unit is at the anchored position so as to block the spatial communication between said vent opening and said internal space.

3. The suction anchoring device as claimed in claim 2, wherein said base unit further includes a fixing member fixing said surface-contacting member onto said bottom wall of said casing, and being formed with a through hole in spatial communication with said vent opening and said through hole of said surface-contacting member.

4. The suction anchoring device as claimed in claim 1, wherein said mounting seat includes a base wall and an inner wall extending upwardly from said base wall and cooperating with said base wall to define a receiving space that receives a bottom end of said connecting member.

5. The suction anchoring device as claimed in claim 4, wherein said movable unit further includes a positioning member that engages said bottom end of said connecting member to stably position said bottom end of said connecting member in said receiving space.

6. The suction anchoring device as claimed in claim 5, wherein said positioning member has an inner surface formed with an internal thread, said bottom end of said connecting member being formed with an external thread to threadedly engage said positioning member.

7. The suction anchoring device as claimed in claim 4, wherein said movable unit further includes a retaining member securely retaining said seal member on a bottom surface of said base wall of said mounting seat.

8. The suction anchoring device as claimed in claim 1, wherein said base unit further includes a support seat, said support seat including a main body that has an annular central part surrounding said casing, and a skirt part extending downwardly and outwardly from a top end of said annular central part so as to provide support to said casing when said movable unit is at the anchored position.

9. The suction anchoring device as claimed in claim 8, wherein said support seat further includes an outer frame that surrounds and is spaced apart from said main body of said support seat, and a plurality of angularly spaced-apart connecting pieces that interconnect said outer frame and said main body of said support seat.

10. The suction anchoring device as claimed in claim 9, wherein each of said connecting pieces is a metal bar.

11. The suction anchoring device as claimed in claim 1, wherein:
    said surrounding wall of said casing includes an upper section, and a lower section that is connected to said upper section, that has a width less than that of said upper section, and that cooperates with said upper section to form an annular shoulder therebetween; and
    said mounting seat further includes an outer wall that is spaced apart from said inner wall, that is in slidable contact with an inner surface of said upper wide section, and that has a bottom end abutting against said annular shoulder when said movable unit is at the anchored position.

12. The suction anchoring device as claimed in claim 1, wherein:
   said surface contact member is made of a resilient material; and
   when said movable unit is moved from the lifted position to the anchored position, said surface-contacting member deforms to vent out the part of air from the suction-forming space so as to generate the suction force.

13. A light fixture comprising:
   said suction anchoring device as claimed in claimed 1; and
   a main body including
      a housing defining a containing space that receives said suction anchoring device therein,
      a connecting seat disposed on said housing and connected to said connecting member of said suction anchoring device, and
      a light-emitting unit disposed on said connecting seat.

14. The light fixture as claimed in claim 13, wherein said connecting seat is disposed above said suction anchoring device.

15. The light fixture as claimed in claim 13, wherein said light-emitting unit includes a light bulb.

16. The light fixture as claimed in claim 13, wherein said light-emitting unit includes a candle, and said connecting seat is a candlestick.

* * * * *